United States Patent
Talmor et al.

(10) Patent No.: US 12,360,754 B2
(45) Date of Patent: Jul. 15, 2025

(54) REFINING SOFTWARE PACKAGE INSTALLATION PROCESSES USING CONFIGURATION MANAGEMENT FILES

(71) Applicant: RED HAT, INC., Raleigh, NC (US)

(72) Inventors: Avraham Talmor, Rishon Lezion (IL); Arie Bregman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 18/204,437

(22) Filed: Jun. 1, 2023

(65) Prior Publication Data
US 2024/0403016 A1     Dec. 5, 2024

(51) Int. Cl.
*G06F 8/61*     (2018.01)
*G06F 11/07*    (2006.01)

(52) U.S. Cl.
CPC ............ *G06F 8/61* (2013.01); *G06F 11/0766* (2013.01)

(58) Field of Classification Search
None
See application file for complete search history.

(56) References Cited

U.S. PATENT DOCUMENTS

| | | | | |
|---|---|---|---|---|
| 9,417,865 B2 * | 8/2016 | Vidal | | G06F 8/71 |
| 2008/0320465 A1 * | 12/2008 | Kinder | | G06F 8/65 |
| | | | | 717/170 |
| 2011/0296396 A1 * | 12/2011 | Kurtakov | | G06F 8/71 |
| | | | | 717/176 |
| 2018/0081661 A1 | 3/2018 | Gonzalez Del Solar et al. | | |

FOREIGN PATENT DOCUMENTS

CN     114489701 A     5/2022

OTHER PUBLICATIONS

Willis, Nathan, "GNU Guix sports functional package management", https://lwn.net/Articles/560857/, Jul. 31, 2013; 1 pp. 1-6.

* cited by examiner

*Primary Examiner* — Marina Lee
(74) *Attorney, Agent, or Firm* — Kilpatrick Townsend & Stockton LLP (57) ABSTRACT

Configuration management files can be generated to refine software package installation processes. For example, a system can identify sections of a file that can define a first installation process for installing a software package in a computing environment. Each of the sections can include commands. The system can also generate a set of tasks for each of the sections by relating each command of each section to a task provided by a package manager. The system can also generate configuration management files for each section that can define a second installation process for the software package. The configuration management files can be generated based on the sets of tasks and based on conditions of the computing environment. The system can then transmit the configuration management files to the package manager to cause the package manager to implement the second installation process for the software package.

20 Claims, 3 Drawing Sheets

REFINING SOFTWARE PACKAGE INSTALLATION PROCESSES USING CONFIGURATION MANAGEMENT FILES

TECHNICAL FIELD

The present disclosure relates generally to software packages and, more particularly (although not necessarily exclusively), to refining software package installation processes using configuration management files.

BACKGROUND

Developers can continue to develop and provide updates for (e.g., new versions of) software over time. For example, developers may provide updates over time that add features to the software or remove existing features from the software. New software may also be created that has similar functionality to older software. A user may wish to replace the existing software in a computing environment with such updates or new software. The software can be built and updated using software packages stored in a software repository. The software repository can additionally include metadata about the software packages installed, the order of installation, dependencies used, environmental variables, and any other details regarding the software. In some cases, the software repository may include metadata regarding package manager files that store installation packages. One example of such package manager files includes Red Hat™ Package Manager (RPM) files for storing installation packages on Linux operating systems.

DETAILED DESCRIPTION

Current systems for installing or updating software packages may not perform the installing or updating in an idempotent way. For example, a software package can be installed in a computing environment for a software system. The software package can be updated, and, as a result, an updated version of the software package may be installed in the computing environment. The updated version of the software package may include a file defining a default installation process for installing the updated version of the software package in the computing environment. The current systems may fully execute the default installation process for the updated version regardless of whether it is required to fully execute the default installation process. For example, there may be portions of the software package and the updated version of the software package that are identical, and therefore will be duplicated at the execution of the default installation process. Thus, the installation of the updated version may not be idempotent and may be an inefficient use of computational resources. Additionally, the current systems may not provide details of default installation processes to users. For example, the current systems may transmit a message to a client device to notify a user that the updated version of the software package was installed. But, the user cannot access further details of the installation, such as changes made to the software build as a result of the installation of the updated version.

Some examples of the present disclosure can overcome one or more of the abovementioned problems via a configuration management tool that can generate configuration management files to refine software package installation processes. For example, the configuration management tool may receive the file defining the default installation process for the updated version of the software package. The configuration management tool may analyze the default installation process to formulate a set of tasks (i.e., executable files) for the installation of the updated version of the software package. The configuration management tool may further detect conditions of the computing environment to determine one or more tasks of the set of tasks that may not need to be executed. Then, the configuration management tool can generate one or more configuration management files that define a modified installation process. For example, the configuration management tool may exclude the one or more tasks from the configuration management files. Thus, the modified installation process can be a refined version of the default installation process. In this way, the modified installation process can be more efficient than the default installation process. For example, the modified installation process can be executed faster due to the one or more tasks being excluded, thereby reducing latency for updating the software system or performing other suitable operations related to updating or installing software packages. Additionally, the modified installation process can use computational resources more efficiently than the default installation process, due to the modified installation process being the refined version of the default installation process.

The configuration management tool can also transmit a report to the client device detailing an execution of the modified installation process. For example, the configuration management tool can transmit the one or more configuration management files to a package manager. The package manager can execute tasks included in the configuration management files to implement the modified installation process. Then, the configuration management tool can generate and transmit the report based on the execution of the tasks. Thus, the report can indicate when each task was executed, whether the execution of each task was successful, or other suitable information associated with each task of the configuration management files. The report may also include differences between the default installation process and the modified installation process, such the one or more tasks for the default installation process that were excluded for the modified installation process. Additionally, the report can indicate changes to the software system as a result of the updated version being installed, such as whether one or more files associated with the software system were replaced or removed during installation. In this way, a user of the client device can access details of the installation of software packages, which can be useful for debugging installation failures or otherwise analyzing installation processes.

In one particular example, a package manager may be installing a software package on a node of a distributed computing environment. An example of the package manager can be Ansible by Red Hat®. Additionally, the software package can include a first file (e.g., a specification file), which can include a set of sections defining a default installation process for installing the software package. Prior to the package manager installing the software package, the configuration management tool can receive the first file and can identify the set of sections. For example, the sections may include an install section and a file section and each of the sections can include commands (i.e., instructions for a software system, such as the package manager, to perform a specific task). The configuration management tool can then relate each command of each section to a task of a plurality of tasks provided by the package manager. As a result of relating each command to a task, the configuration management tool can generate a first set of tasks for the install section and a second set of tasks for the file section.

In Ansible, the sets of tasks can provide a means for installing the software package on the node, but the way in which the tasks are used can be governed by configuration management files (i.e., playbooks in Ansible). For example, the playbooks can specify an order in which the tasks should be executed to install the software package. Therefore, in the particular example, the configuration management tool can generate a configuration management file for each section. Thus, a first configuration management file can include the first set of tasks and a second configuration management file can include the second set of tasks. In this way, each command of each section can be converted to a task. Then, the tasks can be put into configuration management files to organize the tasks for execution. For example, each set of tasks can be organized in each configuration management file in an order corresponding to the commands of each section.

The configuration management tool may further modify the configuration management files to define a modified installation process. The configuration management tool may modify the configuration files based on conditions of the computing environment. For example, the configuration management tool may detect, based on the conditions of the computing environment, that a particular task associated with the install section was previously installed on the node. As a result, the configuration management tool may modify the first configuration management file to exclude the particular task or may otherwise indicate to the package manager that the particular task should be omitted during installation of the software package. In this way, the configuration management files can define a modified installation process that can be more efficient than the default installation process. Additionally, the configuration management tool can transmit the configuration management files to the package manager. As a result, the package manager can implement the modified installation process for the software package by executing the tasks as indicated by the configuration management files.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
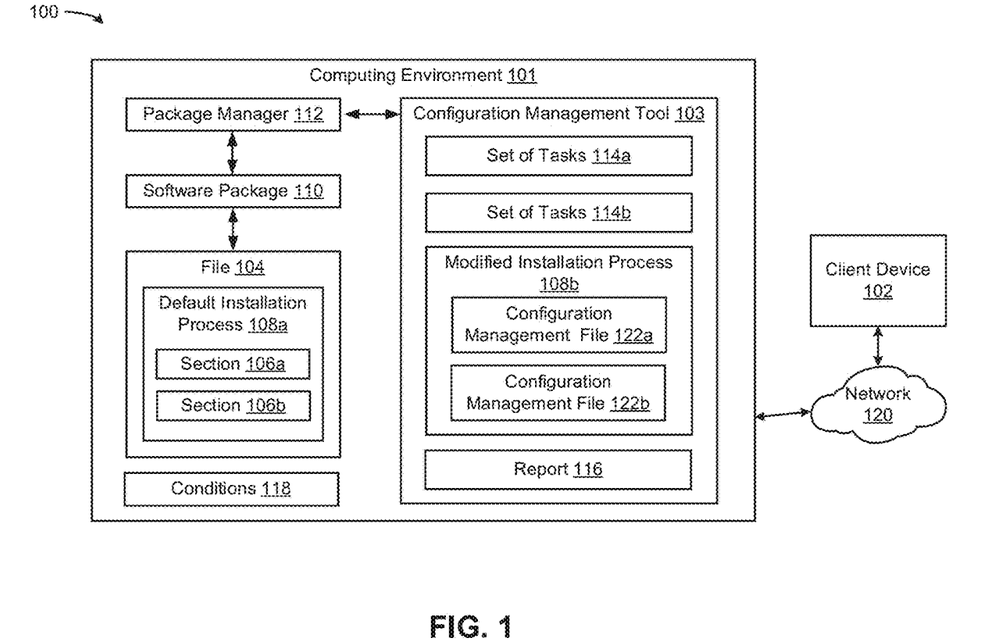
FIG. 1 is a block diagram of an example of a system for refining software package installation processes using configuration management files according to one example of the present disclosure.

FIG. 1 is a block diagram of an example of a system 100 for refining software package installation processes using configuration management files according to one example of the present disclosure. The system 100 includes a configuration management tool 103 that can operate on a computing environment 101. In some examples, the computing environment 101 may be a distributed computer environment, such as a cloud computing system or a computing cluster, formed from one or more nodes (e.g., physical or virtual servers) that are in communication with one another via a network 120. Examples of the network 120 can include a local area network or the Internet. The computing environment 101 may also be communicatively coupled to a client device 102 via the network 120. Examples of the client device 102 can include a desktop computer, laptop computer, server, mobile phone, tablet, etc.

In an example, building or updating a software system associated with the computing environment 101 can include installing a software package 110. The software package 110 can be installed using a package manager 112 (e.g., Red Hat™ Package Manager or Ansible by Red Hat®). Prior to the package manager 112 installing the software package 110, the configuration management tool 103 can refine a default installation process 108a associated with the software package to generate a modified installation process 108b.

For example, the configuration management tool 103 can receive a file 104 associated with the software package 110. The file 104 can be a package manager file, such as a Red Hat™ Package Manager (RPM) file. In particular, the file 104 may be an RPM specification file, which can be a type of RPM file containing commands (i.e., instructions) for building or installing software packages. Thus, the file 104 can define the default installation process 108a. The commands may be organized into sections 106a-b in the file 104. The configuration management tool 103 may identify the sections 106a-b of the file 104 and may further identify each command of each of the sections 106a-b. In this way, the configuration management tool 103 can retrieve the default installation process 108a.

After identifying the sections 106a-b, the configuration management tool 103 can relate each command of each of the sections 106a-b to tasks provided by a package manager 112. In some examples, the tasks may be referred to as modules. The tasks or modules can be executable files that carry out a specific instruction as indicated by one or more commands. For example, a first section 106a can include one or more commands associated with enabling services for the software package 110. Therefore, the configuration management tool 103 can relate the one or more commands of the first section 106a to a service task. The service task can be a predefined task provided by the package manager 112 for controlling services on nodes of the computing environment 101. Additionally, a second section 106b can include one or more commands associated with setting attributes of files for the software package. Thus, the configuration management tool 103 may relate the one or more commands of the second section 106b to a file task. The file task can be a predefined task provided by the package manager for generating (e.g., by setting attributes for) or removing files, directories, or symbolic links.

Consequently, the commands of each of the sections can be related or converted to tasks provided by the package manager 122. However, in some examples, the configuration management tool 103 may detect one or more commands in a section that are unrelated to the predefined tasks provided by the package manager 112. For example, the second section 106b can include one or more commands that are unrelated to the file task, the service task, or other suitable predefined tasks (e.g., copy tasks, template tasks, etc.) As a result, the configuration management tool 103 can relate the one or more commands to a default task (e.g., a shell task or a command task). The default task be used to convert commands unrelated to predefined tasks into executable files. In this way, the configuration management tool 103 can relate or convert an entirety of the commands in each of the sections 106a-b to tasks. Thus, the configuration management tool 103 can be an adaptable and comprehensive tool for refining installation processes.

Additionally, by relating each command of the sections 106a-b to tasks, the configuration management tool 103 can generate sets of tasks 114a-b. For example, the configuration management tool 103 can generate a first set of tasks 114a including tasks related to commands of the first section 106a. Similarly, the configuration management tool 103 can generate a second set of tasks 114b including tasks related to commands of the second section 106b.

Then, the configuration management tool 103 can generate configuration management files 122a-b based on the sets of tasks 114a-b. The configuration management tool 103 can further generate the configuration management files 122a-b based on conditions 118 of the computing environment 101. For example, the configuration management tool 103 can generate a first configuration management file 122a, which can include a subset of the first set of tasks 114a. The configuration management tool 103 can also generate a second configuration management file 122b, which can include a subset of the second set of tasks 114. The subsets of the sets of tasks 114a-b can be determined based on the conditions 118.

The conditions 118 of the computing environment 101 can include any suitable state or attribute of the computing environment 101 that can be associated with the software package 110. For example, the conditions 118 of the computing environment 101 can include associated tasks, files, or software packages previously installed or executed for the computing environment 101. The conditions 118 may also states of the previously executed tasks, files, etc. Thus, the conditions 118 can indicate tasks previously installed in the computing environment 101 or otherwise present in the computing environment 101. In a particular example, a command in the first section 106a can be associated with enabling a particular service. The configuration management tool 103 can detect a corresponding condition of the computing environment 101 indicating that the service is enabled. As a result, a task related to the command and associated with enabling the particular service can be excluded from the subset of the first set of tasks 114a, and therefore excluded from the first configuration management file 122a.

Therefore, the configuration management tool 103 may generate the configuration management files 122a-b by determining tasks required to install the software package 110 (i.e., the sets of tasks 114a-b) and by determining which tasks of the sets of tasks 114a-b are not present in the computing environment 101 (i.e., the subsets of the sets of tasks 114a-b) based on the conditions 118. Additionally, the configuration management tool 103 may generate the configuration management files 122a-b with the subsets of the sets of tasks 114a-b in an order that corresponds to the related commands in the sections 106a-b. As a result, the configuration management files 122a-b can define a modified installation process 108b for installing the software package 110. The modified installation process 108b can be a refined version of the default installation process 108a due to the configuration management tool 103 excluding installed, repetitive, or otherwise unnecessary tasks.

The configuration management tool 103 may then transmit the configuration management files 122a-b to the package manager 112. The package manager 112 can implement the modified installation process 108b by executing the subsets of the sets of tasks 114a-b. In an example, the package manager 112 may receive the first configuration management file 122a before the second configuration management file 122b. As a result, the package manager may execute the subset of the first set of tasks 114a as provided in the first configuration management file 122a before the subset of the second set of tasks 114b as provided in the second configuration management file 122b. In another example, the configuration management tool 103 may provide an indication to the package manager 112 of an order of execution of the configuration management files 122a-b. Additionally, the package manager 122 can execute the subsets of the sets of tasks 114a-b within the configuration management files 122a-b in the respective orders provided by the configuration management files 122a-b.

By implementing the modified installation process 108b, the package manager 112 can install the software package 110 in an idempotent way. For example, the package manager 112 may not install duplicate tasks or otherwise execute or install unnecessary tasks. Conversely, the default installation process 108a can include all tasks for all commands of the sections 106a-b. Therefore, by providing the package manager 112 with the modified installation process 108b, the configuration management tool 103 can facilitate more efficient installation of the software package 110.

Additionally, in some examples, the configuration management tool 103 may further generate a report 116 based on the execution of the subsets of the sets of tasks 114a-b by the package manager 112. For example, the report 116 can include an indication of the execution of each task of the subsets. The report 116 can further indicate whether each task was executed successfully, when each task was executed, etc. In a particular example, the configuration management tool 103 may detect a failure of a task during the execution of the subsets of the sets of tasks 114a-b. In response, the configuration management tool 103 can update the report 116 to include the failure of the task. In doing so, the configuration management tool 103 can facilitate efficient debugging of an installation failure.

Additionally or alternatively, the configuration management tool 103 may determine one or more differences between the default installation process 108a and the modified installation process 108b. For example, the differences can include tasks included in the default installation process 108a that were excluded from the modified installation process 108b. Then, the configuration management tool 103 may update the report 116 to include the one or more differences between the default installation process 108a and the modified installation process 108b. The configuration management tool 103 may also detect one or more changes to the software system as a result of installing the software package 110, and may update the report 116 to also include the one or more changes.

While FIG. 1 depicts a specific arrangement of components, other examples can include more components, fewer components, different components, or a different arrangement of the components shown in FIG. 1. For instance, in other examples, a different number of configuration management files may be generated or a different number of software packages may be installed. Additionally, any component or combination of components depicted in FIG. 1 can be used to implement the process(es) described herein.

Figure 2:
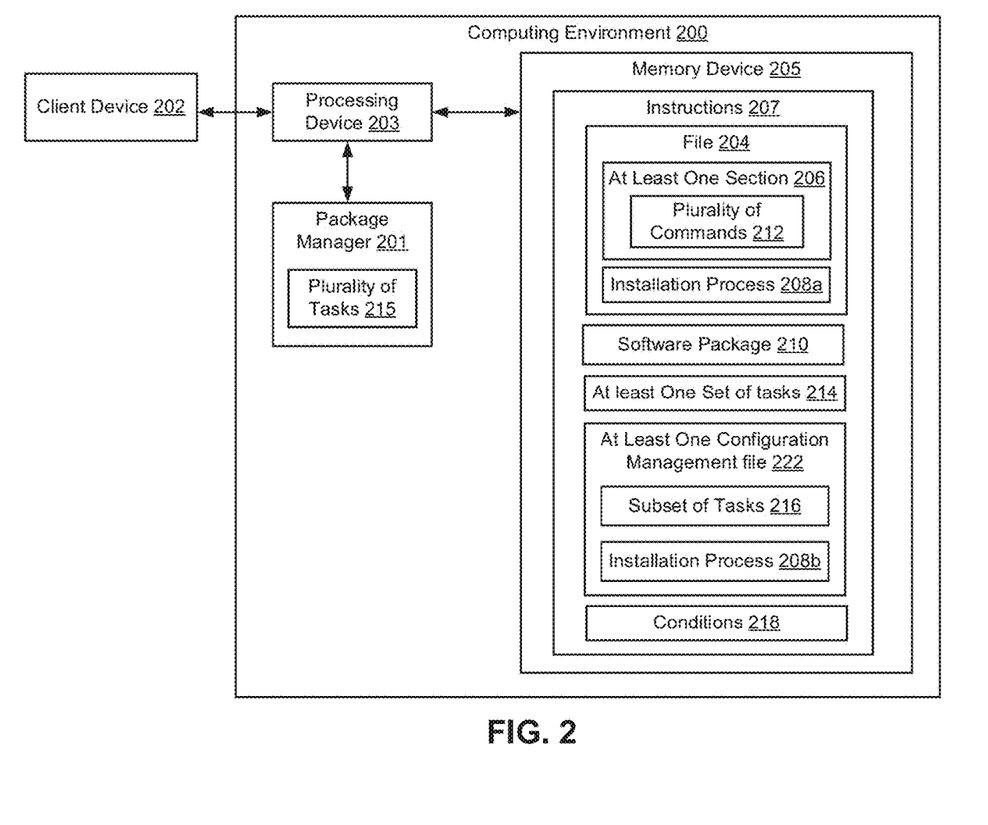
FIG. 2 is a block diagram of an example of a computing environment for refining software package installation processes using configuration management files according to one example of the present disclosure.

FIG. 2 is a block diagram of an example of a computing environment 200 for refining software package installation processes using configuration management files according to one example of the present disclosure. The computing environment 200 includes a processing device 203 communicatively coupled to a memory device 205. In some examples, the components of the computing environment 200, such as the processing device 203 and the memory device 205, may be part of a same computing device. In other examples, the processing device 203 and the memory device 205 can be included in separate computing devices that are communicatively coupled.

The processing device 203 can include one processing device or multiple processing devices. Non-limiting examples of the processing device 203 can include a Field-Programmable Gate Array (FPGA), an application-specific integrated circuit (ASIC), and a microprocessor. The processing device 203 can execute instructions 207 stored in the memory device 205 to perform computing operations. In some examples, the instructions 207 can include processor-specific instructions generated by a compiler or an interpreter from code written in any suitable computer-programming language, such as C, C++, C#, etc.

The memory device 205 can include one memory or multiple memories. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. At least some of the memory device 205 can include a non-transitory computer-readable medium from which the processing device 203 can read instructions 207. A computer-readable medium can include electronic, optical, magnetic, or other storage devices capable of providing the processing device 203 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207. In some examples, the instructions 207 may correspond to the configuration management tool 103 described in FIG. 1.

In some examples, the processing device 203 can execute the instructions 207 to perform some or all of the functionality described herein. For example, the processing device 203 can identify at least one section 206 of a file 204. The at least one section 206 of the file 204 can define a first installation process 208a for installing a software package 210 in the computing environment 200 and the at least one section 206 can include a plurality of commands 212. The processing device 203 can also generate at least one set of tasks 214 for the at least one section 206 by relating each command of the plurality commands 212 to a task of a plurality of tasks 215 provided by a package manager 201. Additionally, the processing device 203 can generate at least one configuration management file 222 defining a second installation process 208b for the software package 210 based on the at least one set of tasks 214 and based on one or more conditions 218 of the computing environment 200. The at least one configuration management file 222 can include a subset of tasks 216 from the at least one set of tasks 214. The processing device 203 can then transmit the at least one configuration management file 222 to the package manager 201 to cause the package manager 201 to implement the second installation process 208b for the software package 210 by executing the subset of tasks 216.

Figure 3:
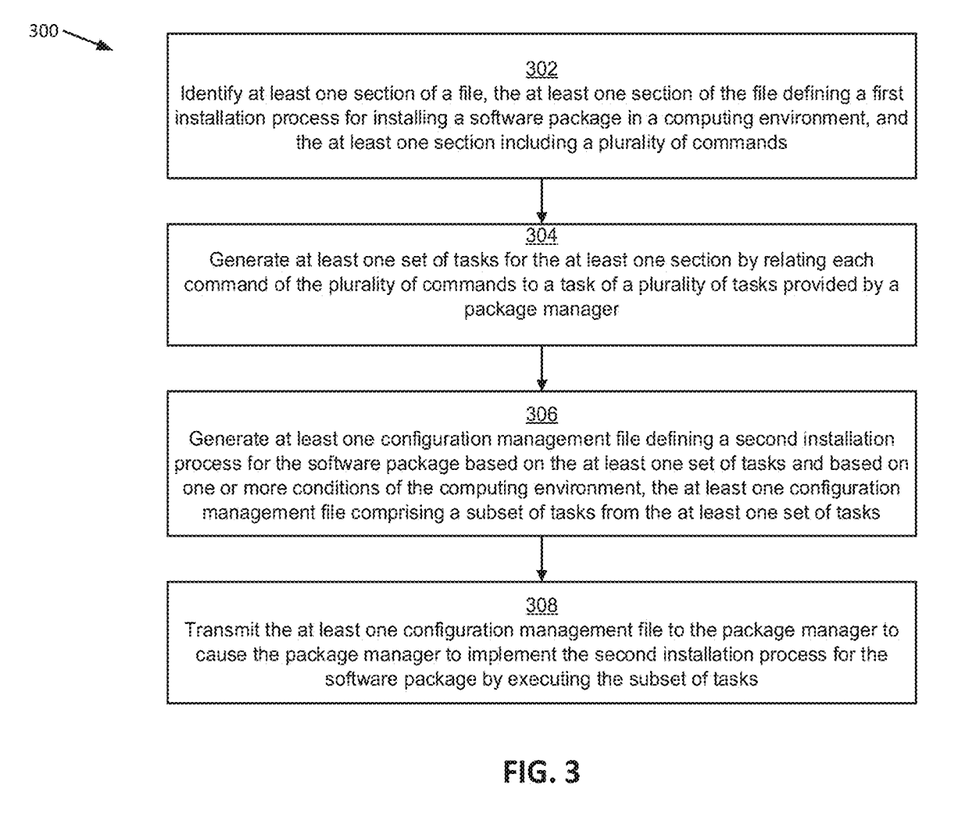
FIG. 3 is a flowchart of a process for refining software package installation processes using configuration management files according to one example of the present disclosure.

FIG. 3 is a flowchart of a process 300 for refining software package installation processes using configuration management files according to one example of the present disclosure. In some examples, the processing device 203 can implement some or all of the steps shown in FIG. 3. Additionally, in some examples, the processing device 203 can be executing the configuration management tool 103 of FIG. 1 to implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processing device 203 identifies the at least one section 206 of a file 204, the at least one section 206 of the file 204 defining a first installation process 208a for installing a software package 210 in a computing environment 200, and the at least one section 206 including a plurality of commands 212. In an example, the file 204 can be an RPM specification file that provides instructions for installing the software package 210. The software package 210 can correspond to the software package 110 of FIG. 1. Thus, the first installation process 208a can be a default installation process 108a for installing the software package 210. The default installation process 108a can include all of the instructions (e.g., tasks) associated with installing the software package 210. Therefore, implementation of the first installation process 208a can be inefficient.

At block 304, the processing device 203 generates at least one set of tasks 214 for the at least one section 206 by relating each command of the plurality of commands 212 to a task of a plurality of tasks 215 provided by the package manager 201. For example, the at least one section 206 can correspond to the sections 106a-b of FIG. 1. Therefore, a first section 106a can be associated with a first set of tasks 114a and a second section 106b can be associated with a second set of tasks 114b. Each command of the first section 106a can be related to a task of the plurality of tasks 215 to generate the first set of tasks 114a. Additionally, each command of the second section 106b can be related to a task of the plurality of tasks 215 to generate the second set of tasks 114b. In this way, the commands of each of the sections 106a-b can be converted to corresponding tasks.

At block 306, the processing device 203 generates at least one configuration management file 222 defining a second installation process 208b for the software package 210 based on the at least one set of tasks 214 and based on one or more conditions 218 of the computing environment 200, the at least one configuration management file 222 comprising a subset of tasks 216 from the at least one set of tasks 214. The at least one configuration management file 222 can correspond to the configuration management files 122a-b of FIG. 1. For example, the processing device 203 may determine, based on the conditions 218, a first subset of the first set of tasks 114a that are present in the computing environment 200. For example, the first set of tasks 114a may have been previously executed or installed in the computing environment 200. The processing device 203 may further determine a second subset of the first set of tasks 114a that are not present in the computing environment 200. Therefore, the processing device 203 can generate a first configuration management file 122a with the second subset of the first set of tasks 114a.

The processing device 203 can also determine, based on the conditions 218, a first subset of the second set of tasks 114b that are present in the computing environment 200. For example, the first subset of the second set of tasks 114b may have been previously executed or installed in the computing environment 200. The processing device 203 may further determine a second subset of the second set of tasks 114b that are not present in the computing environment 200.

Therefore, the processing device 203 can generate a second configuration management file 122b with the second subset of the second set of tasks 114b.

Therefore, the processing device 203 can generate configuration management files 122a-b with tasks required for installation and can exclude tasks that may not required for installation due to, for example, being previously installed. In this way, the second installation process 208b defined by the configuration management files 122a-b can be a modified installation process 108b that is more efficient than the default installation process 108a. Additionally, the processing device 203 can generate the configuration management files 122a-b to include the subsets of the sets of tasks 114a-b in an order corresponding to the commands in each of the sections 106a-b.

At block 308, the processing device 203 transmits the at least one configuration management file 222 to the package manager 201 to cause the package manager 201 to implement the second installation process 208b for the software package 210 by executing the subset of tasks 216. Due to the configuration management files 122a-b being generated based on the conditions 218, the implementation of the second installation process 208b can be more efficient than an implementation of the first installation process 208a. For example, the second installation process 208b can be a more efficient use of computational resources than the first installation process. Additionally, installing the software package 210 more efficiently can reduce latency for updating or installing an associated software system.

Additionally, in some examples, the processing device 203 may further generate a report 116 based on the execution of the subset of tasks 216 by the package manager 201. The report 116 can include an indication of the execution of each task of the subset of tasks 216 including whether each task was executed successfully, when each task was executed, etc. Additionally or alternatively, the processing device 203 may determine differences between the first installation process 208a and the second installation process 208b. For example, the differences can include the first subset of the first set of tasks 114a and the first subset of the second set of tasks 114b included in the first installation process 208a that were excluded from the second installation process 208b. Then, the processing device 203 may update the report 116 to include the differences.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
identifying at least one section of a file, the at least one section of the file defining a first installation process for installing a software package in a computing environment, and the at least one section including a plurality of commands;
generating at least one set of tasks for the at least one section by relating each command of the plurality of commands to a task of a plurality of tasks provided by a package manager;
generating at least one configuration management file defining a second installation process for the software package based on the at least one set of tasks and based on one or more conditions of the computing environment, the at least one configuration management file comprising a subset of tasks from the at least one set of tasks; and
transmitting the at least one configuration management file to the package manager to cause the package manager to implement the second installation process for the software package by executing each task of the subset of tasks.

2. The system of claim 1, wherein the operation of generating the at least one configuration management file further comprises:
determining the subset of tasks from the at least one set of tasks based on the one or more conditions of the computing environment; and
inputting the subset of tasks into the at least one configuration management file in an order corresponding to the plurality of commands.

3. The system of claim 2, wherein the operation of determining the subset of tasks from the at least one set of tasks comprises:
determining, based on the one or more conditions of the computing environment, that the subset of tasks are involved in installing the software package and are not present in the computing environment.

4. The system of claim 1, wherein the memory device further includes instructions executable by the processing device for causing the processing device to perform operations comprising:
generating a report based on the execution of each task of the subset of tasks by the package manager, the report comprising an indication of the execution of each task of the subset of tasks; and
transmitting, to a client device, the report.

5. The system of claim 4, wherein the memory device further includes instructions executable by the processing device for causing the processing device to perform operations comprising:
determining one or more differences between the first installation process and the second installation process; and
updating the report to include the one or more differences between the first installation process and the second installation process.

6. The system of claim 4, wherein the memory device further includes instructions executable by the processing device for causing the processing device to perform operations comprising:
detecting a failure of a task during the execution of the subset of tasks; and
in response to detecting the failure, updating the report to include the failure of the task.

7. The system of claim 1, wherein the plurality of tasks includes a plurality of predefined tasks, and wherein the operation of generating the at least one set of tasks further comprises:
detecting at least one command of the plurality of commands that is unrelated to the plurality of predefined tasks; and
in response to detecting that the at least one command is unrelated to the plurality of predefined tasks, relating the at least one command to a default task included in the plurality of tasks.

8. A computer-implemented method comprising:
identifying at least one section of a file, the at least one section of the file defining a first installation process for installing a software package in a computing environment, and the at least one section including a plurality of commands;
generating at least one set of tasks for the at least one section by relating each command of the plurality of commands to a task of a plurality of tasks provided by a package manager;
generating at least one configuration management file defining a second installation process for the software package based on the at least one set of tasks and based on one or more conditions of the computing environment, the at least one configuration management file comprising a subset of tasks from the at least one set of tasks; and
transmitting the at least one configuration management file to the package manager to cause the package manager to implement the second installation process for the software package by executing each task of the subset of tasks.

9. The computer-implemented method of claim 8, wherein generating the at least one configuration management file further comprises:
determining the subset of tasks from the at least one set of tasks based on the one or more conditions of the computing environment; and
inputting the subset of tasks into the at least one configuration management file in an order corresponding to the plurality of commands.

10. The computer-implemented method of claim 9, wherein determining the subset of tasks from the at least one set of tasks comprises:
determining, based on the one or more conditions of the computing environment, that the subset of tasks are involved in installing the software package and are not present in the computing environment.

11. The computer-implemented method of claim 8, further comprising:
generating a report based on the execution of each task of the subset of tasks by the package manager, the report comprising an indication of the execution of each task of the subset of tasks; and
transmitting, to a client device, the report.

12. The computer-implemented method of claim 11, further comprising:
determining one or more differences between the first installation process and the second installation process; and
updating the report to include the one or more differences between the first installation process and the second installation process.

13. The computer-implemented method of claim 11, further comprising:
detecting a failure of a task during the execution of the subset of tasks; and
in response to detecting the failure, updating the report to include the failure of the task.

14. The computer-implemented method of claim 8, wherein the plurality of tasks includes a plurality of predefined tasks, and wherein generating the at least one set of tasks further comprises:
detecting at least one command of the plurality of commands that is unrelated to the plurality of predefined tasks; and
in response to detecting that the at least one command is unrelated to the plurality of predefined tasks, relating the at least one command to a default task included in the plurality of tasks.

15. A non-transitory computer-readable medium comprising instructions that are executable by a processing device for causing the processing device to perform operations comprising:
identifying at least one section of a file, the at least one section of the file defining a first installation process for installing a software package in a computing environment, and the at least one section including a plurality of commands;
generating at least one set of tasks for the at least one section by relating each command of the plurality of commands to a task of a plurality of tasks provided by a package manager;
generating at least one configuration management file defining a second installation process for the software package based on the at least one set of tasks and based on one or more conditions of the computing environment, the at least one configuration management file comprising a subset of tasks from the at least one set of tasks; and
transmitting the at least one configuration management file to the package manager to cause the package manager to implement the second installation process for the software package by executing each task of the subset of tasks.

16. The non-transitory computer-readable medium of claim 15, wherein the operation of generating the at least one configuration management file further comprises:
determining the subset of tasks from the at least one set of tasks based on the one or more conditions of the computing environment; and
inputting the subset of tasks into the at least one configuration management file in an order corresponding to the plurality of commands.

17. The non-transitory computer-readable medium of claim 16, wherein the operation of determining the subset of tasks from the at least one set of tasks comprises:
determining, based on the one or more conditions of the computing environment, that the subset of tasks are involved in installing the software package and are not present in the computing environment.

18. The non-transitory computer-readable medium of claim 15, further comprising instructions that are executable by the processing device for causing the processing device to perform operations comprising:
generating a report based on the execution of each task of the subset of tasks by the package manager, the report comprising an indication of the execution of each task of the subset of tasks; and
transmitting, to a client device, the report.

19. The non-transitory computer-readable medium of claim 18, further comprising instructions that are executable by the processing device for causing the processing device to perform operations comprising:
determining one or more differences between the first installation process and the second installation process; and
updating the report to include the one or more differences between the first installation process and the second installation process.

20. The non-transitory computer-readable medium of claim 18, further comprising instructions that are executable by the processing device for causing the processing device to perform operations comprising:
  detecting a failure of a task during the execution of the subset of tasks; and
  in response to detecting the failure, updating the report to include the failure of the task.

\* \* \* \* \*